United States Patent [19]

Sundeen

[11] 4,433,572

[45] Feb. 28, 1984

[54] ENGINE OPERATION RELATED EVENT TIMING SYSTEM

[75] Inventor: Arthur R. Sundeen, Lansing, Mich.

[73] Assignee: General Motors Corporation, Detroit, Mich.

[21] Appl. No.: 396,814

[22] Filed: Jul. 9, 1982

[51] Int. Cl.³ .......................................... G01M 15/00
[52] U.S. Cl. ....................................................... 73/116
[58] Field of Search .................. 73/116, 117.3, 119 R

[56] References Cited

U.S. PATENT DOCUMENTS 3,820,386   6/1974   Grikscheit et al. .................. 73/116
4,064,747  12/1977   Rackliffe et al. ..................... 73/116

Primary Examiner—Jerry W. Myracle
Attorney, Agent, or Firm—Mark A. Navarre

[57] ABSTRACT

Passage of an engine piston through reference positions while traveling toward and away from a dead center position is sensed to produce pulses that define an engine displacement, the midpoint of which corresponds to the passage of the piston through the dead center position. Expressions of motion for the full displacement and one of the half displacements are simultaneously solved to determine the time at which the piston passed through the dead center position.

3 Claims, 12 Drawing Figures

ENGINE OPERATION RELATED EVENT TIMING SYSTEM

This invention relates to a timing system for an internal combustion engine and more particularly to an apparatus for providing engine piston position information for diagnostic or control purposes.

In controlling the operation of an internal combustion engine, the timing of certain control events must be performed with a high degree of accuracy to achieve optimum performance, economy, and emission control. In a gasoline engine, for example, spark ignition is controlled, while in a diesel engine, fuel injection is controlled. In each case, the control event is initiated in timed relation to a specified engine position. Generally, the specified engine position is designated as the position for which a selected piston reaches the top dead center (TDC) position. According to common practice, the top dead center position is defined as the engine rotary position for which the selected piston is fully extended into its respective cylinder—that is, the top of its stroke. Alternatively, of course, a piston bottom dead center position may be chosen as the specified engine position, bottom dead center being defined as the engine position for which the selected piston reaches the bottom of its stroke.

It has been proposed to determine the top dead center position of an engine by detecting the movement of the selected piston as the engine is cranked or otherwise driven at a constant speed.

According to one technique, a testing instrument is inserted into the engine cylinder through a spark plug opening so that the piston contacts the instrument for a portion of its stroke. The period of contact then enables an operator or machine to determine the top dead center position since top dead center occurs midway between the commencement and termination of piston contacting.

According to another technique, a proximity detector is located in a manner to detect the periodic movement of a piston related member, developing a pulse centered about the top dead center position of the piston.

Another technique for determining the top dead center position is described in SAE Technical Paper 790103, Lienesch, Krage, entitled, "Using Microwaves to Phase Cylinder Pressure to Crankshaft Position". A cylinder of the engine is radiated with microwave energy and points of resonance before and after top dead center are detected. Such points of resonance correspond to equal cylinder volumes as the piston moves toward and away from top dead center, and are therefore symmetrically spaced about top dead center.

While such techniques may be useful for testing or calibration purposes at constant engine speed, they do not account for engine acceleration and are therefore not particularly suited for use in an onboard system wherein the top dead center position is continuously or periodically determined for control purposes.

Prior art onboard timing control systems generally reference the timing control with respect to fixed timing marks on a rotatable engine element. Such marks enable accurate engine timing control when the engine is new and properly calibrated, but control accuracy decreases with engine wear.

Accordingly, it is an object of this invention to provide an improved system for determining the time at which a selected engine piston passes through a dead center position of its travel wherein the time determination accounts for engine acceleration.

It is another object of this invention to provide an improved system of the above type wherein the time determination is substantially unaffected by engine wear.

It is a further object of this invention to provide an improved system for determining the time at which an engine piston passes through a dead center position wherein a novel piston sensing mechanism provides piston position information before and after the passage of the piston through the dead center position and wherein such information is used in conjunction with unique mathematical expressions of engine crankshaft motion to arrive at a timing determination that accounts for engine acceleration and is substantially unaffected by part tolerance or assembly variations in the piston sensing mechanism.

These objects are carried forward with a sensor mechanism that detects the passage of a selected piston through a pair of reference positions at times $T_1$ and $T_2$ while it is traveling toward the dead center position and at times $T_3$ and $T_4$ while it is traveling away from the dead center position. Through a novel application and solution of general expressions of rotary motion respecting discrete crankshaft displacements defined by the times $T_1$–$T_4$, the timing system of this invention determines the time $T_{dc}$ at which the piston passed through the dead center position solely in terms of the detected times $T_1$–$T_4$. Since the motion expressions account for engine acceleration over the detected period of motion, the timing determination of this invention is conveniently suited for use in an onboard vehicle system wherein dead center or control event timing must be repeatedly determined under the prevailing engine acceleration. The novel solution of the motion expressions described herein permits determination of the timing value strictly in terms of the detected times $T_1$–$T_4$ so that the timing value is substantially unaffected by wear or variation in sensor part manufacture and assembly.

The reference piston positions through which passage of the piston is detected are established by a sensor positioned along the piston travel path which sensor is responsive to the passage of a piston carried member. The location of the sensor is chosen so that the cyclic engine speed variations due to the isolated engine combustion engine events do not affect the timing determination. Specifically, the sensor is located such that the distance between the reference positions and the piston dead center position is substantially an integral multiple of $180/N$ piston cycle degrees, where N is the number of combustion events per piston cycle. In this way, the combustion event induced speed variations are the same when the piston passes the reference positions while traveling toward dead center as when the piston passes the reference positions while traveling away from dead center. As a result, the displacement of the crankshaft before and after the dead center position are equally affected thereby.

The term "acceleration" as used herein with respect to engine operation is meant to include negative acceleration or deceleration as well as positive acceleration.

IN THE DRAWINGS

FIG. 2 is a section of FIG. 1 along lines 2—2.

Figure 1:
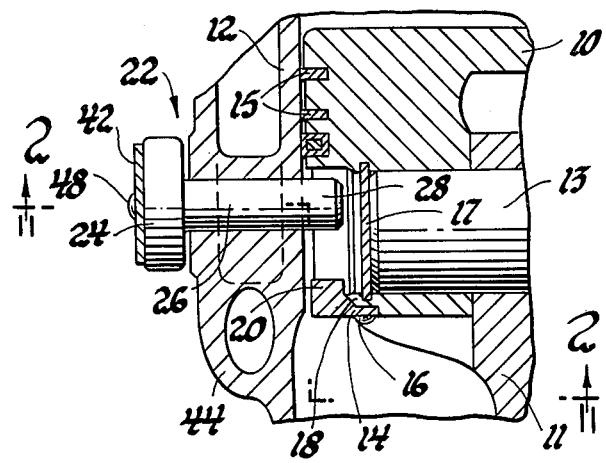
FIGS. 1 and 2 illustrate the selected piston and the piston position detecting mechanism.
Figure 2:
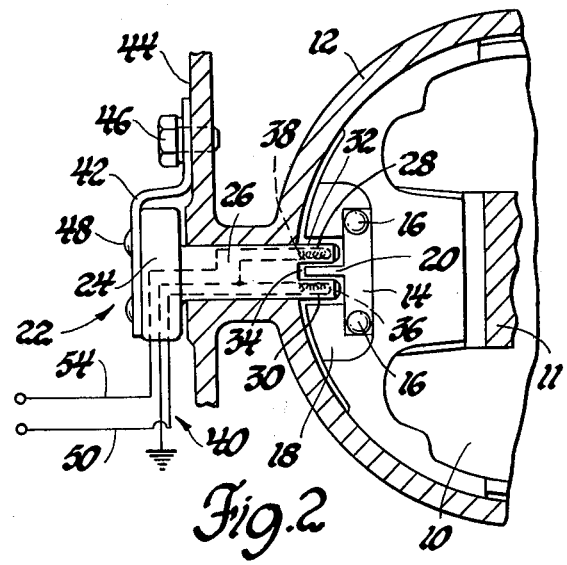

Referring now more particularly to FIGS. 1 and 2, there is shown a portion of a largely conventional internal combustion engine including piston 10, piston rings 15, cylinder 12, wrist pin 13, and wrist pin seal 17. Piston 10 is adapted to reciprocate within cylinder 12 and is connected to the engine crankshaft (not shown) via connecting arm 11 and wrist pin 13 in a conventional manner. In FIG. 1, piston 10 is shown in a position at or near bottom dead center.

A vane 14 of conductive material is rigidly connected by fasteners 16 to a portion 18 of piston 10 that is recessed relative to the cylinder contacting portion of piston 10. As indicated in FIGS. 1 and 2, such portion may be the recess conventionally provided for wrist pin 13. Vane 14 is positioned with respect to piston 10 so that its tip 20 extends radially outward from recessed portion 18 but does not touch the inner wall of cylinder 12 as piston 10 reciprocates therein.

A sensor assembly designated generally by reference numeral 22 comprises a mounting flange 24, a stem 26, and a bifurcated tip 28. The tip 28 comprises two arms 30 and 32 separated by an air gap 34. Each arm houses an electrical winding 36, 38 as schematically illustrated in dashed lines in FIG. 2. Windings 36 and 38 are connected as indicated and the lead-in conductors designated generally by reference numeral 40 pass through sensor stem 26 and mounting flange 24 for connection to the pulse producing circuitry depicted in FIG. 3. Sensor mounting flange 24 is fastened via bracket 42 to an engine housing member 44 with bolt 46 as shown so that when piston 10 is reciprocated within cylinder 12, the vane 14 passes between sensor arms 30 and 32. Fasteners 48 secure sensor assembly 22 to bracket 42 to prevent sensor 22 from rotating within cylinder 12.

As will later be explained, winding 36 is energized with alternating current and the voltage across winding 38 is monitored as an indication of the magnetic coupling therebetween. When conductive vane 14 enters the air gap 34 according to the movement of piston 10, the magnetic coupling between windings 36 and 38 is significantly attenuated due to the inducement of Eddy currents in vane 14. Thus, the reciprocatory movement of piston 10 in cylinder 12 periodically alters the magnetic coupling between coils 36 and 38, such altered periods being detectable as will be explained in reference to FIGS. 3 and 4 by monitoring the induced voltage in winding 38.

Figure 3:
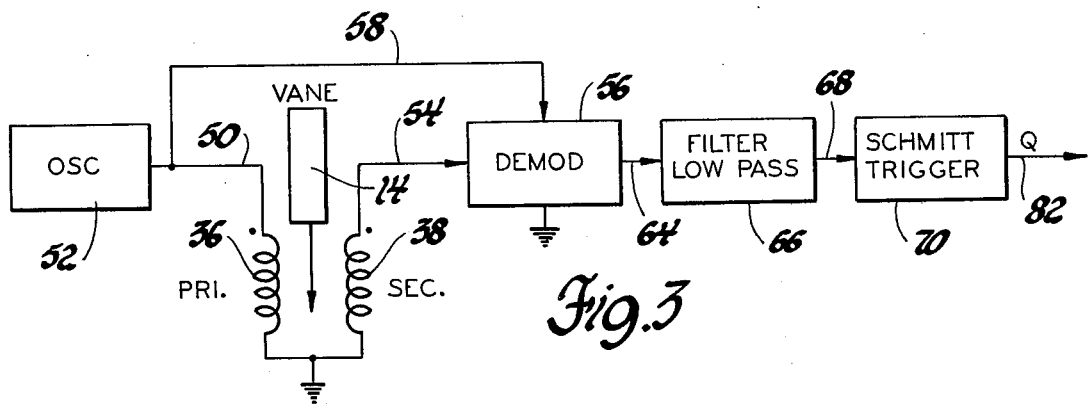
FIG. 3 illustrates the sensor pulse producing circuitry.
Figure 4:
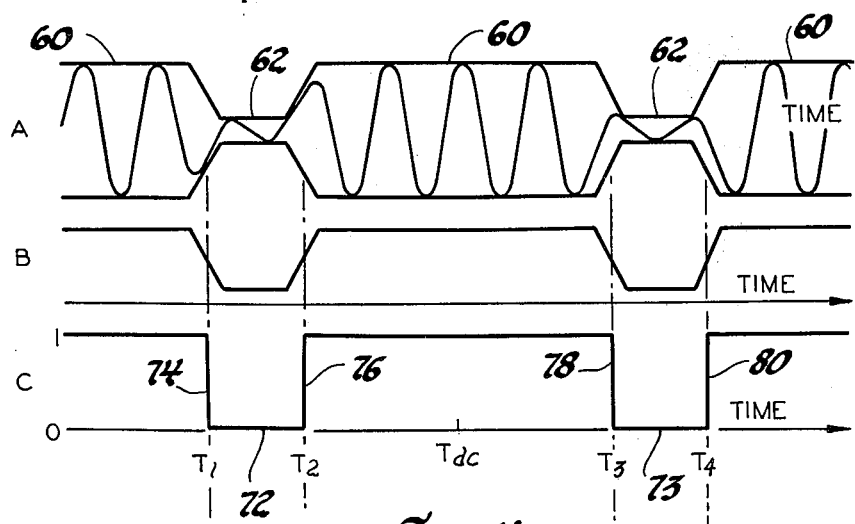
FIG. 4 is a graph depicting various idealized waveforms as a function of time for the circuit of FIG. 3.

Referring now more specifically to FIGS. 3 and 4, vane 14 and sensor windings 36 and 38 are shown schematically along with the appropriate circuitry for extracting piston position information therefrom. The undotted ends of windings 36 and 38 are connected to ground potential. The dotted end of winding 36 is connected via line 50 to square wave oscillator 52 which continuously energizes winding 36 with alternating current. The voltage thereby induced in winding 38 is applied as an input via line 54 to demodulator 56. The output of oscillator 52 is applied as a second input to demodulator 56 via line 58.

The induced voltage in winding 38 is depicted in graph A of FIG. 4 as a function of time. The periodic passing of vane 14 through air gap 34 produces alternate periods of altered and unaltered magnetic coupling. When vane 14 is not within air gap 34, the envelope voltage induced in winding 38 is at a relatively high level as designated by reference numerals 60. When vane 14 is within the air gap 34, the magnetic coupling is attenuated and the envelope voltage is at a low level as designated by reference numerals 62. Demodulator 56 detects the positive envelope voltage in a conventional manner and the output of demodulator 56 is depicted in graph B of FIG. 4 as a function of time. It will be understood that a variety of devices may be used to perform the function of demodulator 56 but that according to the preferred embodiment, a synchronous demodulator is used in order to achieve a high level of noise rejection.

The output of demodulator 56 is connected as an input via line 64 to low pass filter 66 which further rejects high frequency noise.

The output of filter 66 is connected as an input via line 68 to Schmitt trigger 70 which functions to shorten the rise times and fall times of the digital filter output, thereby developing a signal more suitable for use with digital logic circuitry. Schmitt trigger 70 thus produces a series of pulses 72 and 73 at its Q output on line 82, as depicted in graph C of FIG. 4. The reference numeral 72 designates pulses preceding top dead center (TDC) while reference numeral 73 designates pulses succeeding or following top dead center.

Figure 9:
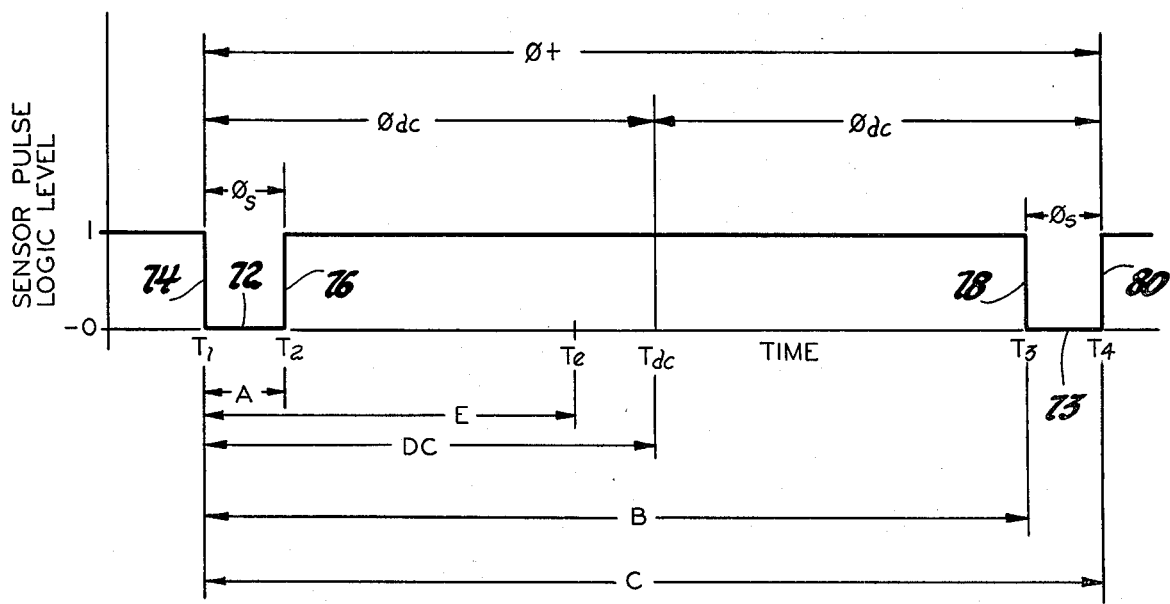
FIG. 9 is a timing diagram depicting the various sensor pulse time periods and angular distances used in the determination of top dead center.

The Q output of Schmitt trigger 70 is also shown in FIG. 9. In that figure, various time and distance relationships among sensor pulses 72 and 73 are identified.

The angular width of pulse 72 is equal to that of pulse 73, and each distance is designated as $\phi_s$. This dimension is related to the width of vane 14 and in the illustrated embodiment, is approximately 8 piston cycle degrees. The symbol $\phi_t$ represents the distance between leading edge 74 of sensor pulse 72 and trailing edge 80 of sensor pulse 73. This dimension is related to the relative placement of vane 14 and sensor 22 and is chosen as will be described in reference to FIG. 6 so that the timing indication determined according to the teaching of this invention is insensitive to cyclic engine speed variations caused by the isolated engine combustion events. The dead center position bisects the angular distance $\phi_t$ into two equal angular distances $\phi_{dc}$ before and after the dead center position as shown.

As indicated, the above-defined dimensions relate to angular displacement of the engine crankshaft as detected by the position of the selected piston. Furthermore, such dimensions are determined by the sensor geometry and are therefore unaffected by changes in engine speed.

On the time scale, times $T_1$–$T_4$ correspond to the sensor pulse edges 74, 76, 78 and 80, respectively. Time $T_e$ corresponds to the initiation of the engine control event, and time $T_{dc}$ corresponds to the top dead center position. Interval A is equal to $(T_2-T_1)$, interval B is equal to $(T_3-T_1)$, and interval C is equal to $(T_4-T_1)$. Time interval DC is equal to $(T_{dc}-T_1)$ and interval E is equal to $(T_e-T_1)$.

It will be appreciated that unlike the angular dimensions defined above, the time intervals will vary with changes in engine speed.

At constant average engine speed, time $T_{dc}$ occurs at midpoint of interval C and the interval DC may be determined according to the expression $$DC = C/2 \tag{1}$$

Under conditions of engine acceleration, however, time $T_{dc}$ does not occur at the midpoint of interval C. Time $T_{dc}$ occurs before the midpoint under conditions of negative acceleration (deceleration) and after the midpoint under conditions of positive acceleration.

This invention presents a novel application and solution of general mathematical expressions of rotary motion respecting crankshaft displacements defined by the above time intervals for determining the time $T_{dc}$ at which piston 10 passed through the dead center position in a compression/power cycle.

As applied to angular rotation, the general expression of motion is $$\phi = (\tfrac{1}{2})A_v T^2 + W_o T \tag{2}$$

where $\phi$ is angular displacement, $A_v$ is average angular acceleration during such displacement, T is the time interval of the displacement, and $W_o$ is the angular velocity at the beginning of time interval T.

Applying expression (2) to the crankshaft displacement $\phi_t$ yields $$\phi_t = (\tfrac{1}{2})A_v(C)^2 + W_o(C) \tag{3}$$

where $A_v$ represents the average acceleration between times $T_1$ and $T_4$, and $W_o$ is the angular velocity at time $T_1$.

Applying expression (2) to the crankshaft displacement $\phi_{dc}$ defined by times $T_1$ and $T_{dc}$ yields $$\phi_{dc} = (\tfrac{1}{2})A_v(DC)^2 + W_o(DC) \tag{4}$$

where $A_v$ represents the average acceleration between times $T_1$ and $T_{dc}$, and $W_o$ is the angular velocity at time $T_1$.

Since $\phi_t = 2\phi_{dc}$, expressions (3) and (4) may be combined to yield:

$$2\phi_{dc} = (\tfrac{1}{2})A_v(C)^2 + W_o(C) \tag{5}$$

If it is assumed that the average acceleration $A_v$ is constant between times $T_1$ and $T_4$, expressions (3) and (5) may be solved simultaneously for time interval DC, yielding:

$$DC = -(W_o/A_v) + [(W_o/A_v)^2 + C^2/2 + C(W_o/A_v)]^{\tfrac{1}{2}} \tag{6}$$

It will now be appreciated that, in keeping with this invention, equivalent results may be obtained by the simultaneous solution for time interval DC of motion expressions for another pair of crankshaft displacements if at least one of the displacements is defined in terms of interval DC, and if the relation between the displacements is known. An example of two such displacements are the displacements corresponding to time intervals (DC-A) and (B-A).

As indicated above, $W_o$ is the angular velocity of the crankshaft at time $T_1$. If interval A is short compared to interval C, the value of $W_o$ may be approximated as:

$$W_o \approx \phi_s/A \tag{7}$$

Similarly, the speed of rotation $W_f$ at time $T_4$ may be approximated as:

$$W_f \approx \phi_s/(C-B) \tag{8}$$

The average acceleration $A_v$ over the time period C is given by the expression:

$$A_v = (W_f - W_o)/(T_f - T_o) \tag{9}$$

where $T_f$ is the time for which $W_f$ is determined and $T_o$ is the time for which $W_o$ is determined.

If $W_o$ and $W_f$ are approximated according to expressions (7) and (8) respectively, the corresponding values of $T_o$ and $T_f$ are the midpoints of intervals A and (C-B), respectively.

If $W_f$ and $W_o$ are known or otherwise determinable, the term $W_o/A_v$ in expression (6) may thus be given as $W_o/A_v = W_o(C)/(W_f - W_o)$. Thus, $T_o$ and $T_f$ are given according to the expression:

$$T_o = (A/2), \text{ and} \tag{10}$$

$$T_f = B + (C-B)/2 \tag{11}$$

Combining expressions (7)–(11), the average acceleration $A_v$ may be approximated as:

$$A_v \approx \frac{2\phi_s(A - C + B)}{A(C - B)(B + C - A)} \tag{12}$$

Referring now to expression (6), it will be seen that the quantities $A_v$ and $W_o$ only appear in the form $(W_o/A_v)$ or $(W_o/A_v)^2$. Combining expressions (7) and (12), the approximate expression for $(W_o/A_v)$ is:

$$W_o/A_v \approx \frac{(C - B)(B + C - A)}{2(A - C + B)} \tag{13}$$

One possible solution for the time interval DC is the solution of expression (13) for the term $(W_o/A_v)$ and the direct substitution of such term into the righthand side of expression (6). However, the approach given above requires the differencing of two large terms:

$(W_o/A_v)$ and $[(W_o/A_v)^2 + C^2/2 + C(W_o/A_v)]^{\tfrac{1}{2}}$ when $A_v$ approaches zero. This approach may be used, however, by solving for the time interval DC according to the simplified expression (1) when the magnitude of the term $A_v$ is less than a given value.

In such approach, the procedure for determining the time interval DC is as follows:
(1) Measure intervals A, B and C.
(2) Determine $(W_o/A_v)$ as a function of A, B and C, using expression (13).

(3) Determine DC as a function of $(W_o/A_v)$ and C, using expression (6).

An Alternate preferred approach to the solution of expressions (6) and (13) involves a binomial expansion of the term:

$$[(W_o/A_v)^2 + C^2/2 + C(W_o/A_v)]^{\frac{1}{2}} \qquad (14)$$

The binomial expansion produces a series of the general form:

$$(a+x)^n = a^n + n \times a^{n-1} + [n(n-1) \times {}^2 a^{n-2}/2!] + [n(n-1)(n-2) \times {}^3 a^{n-3}/3!] + [n(n-1)(n-2)(n-3) \times {}^4 a^{n-4}/4!] \qquad (15)$$

If the term $a = (W_o/A_v)^2$, the term $x = [C^2/2 + CW_o/A_v]$, and the term $n = \frac{1}{2}$, expression (15) as applied to expression (6) yields:

$$DC = \frac{1}{2}\left[\frac{A_v}{W_o}\right]\left[\frac{C^2}{2} + \frac{CW_o}{A_v}\right] - \frac{1}{8}\left[\frac{A_v}{W_o}\right]^3\left[\frac{C^2}{2} + \frac{CW_o}{A_v}\right]^2 + \frac{1}{16}\left[\frac{A_v}{W_o}\right]^5\left[\frac{C^2}{2} + \frac{CW_o}{A_v}\right]^3 - \frac{5}{128}\left[\frac{A_v}{W_o}\right]^7\left[\frac{C^2}{2} + \frac{CW_o}{A_v}\right]^4 \qquad (16)$$

By arranging expression (16) somewhat differently, the term $A_v$ may be moved from the denominator to the numerator so that small values of acceleration will not produce undesirably large numbers for terms such as $(CW_o/A_v)$. When so arranged, expression (16) appears as:

$$DC = \frac{C}{2}\left[\frac{CA_v}{2W_o} + 1\right] - \frac{C^2 A_v}{8W_o}\left[\frac{CA_v}{2W_o} + 1\right]^2 + \frac{C^3}{16}\left[\frac{A_v}{W_o}\right]^2\left[\frac{CA_v}{2W_o} + 1\right]^3 - \frac{5C^4}{128}\left[\frac{A_v}{W_o}\right]^3\left[\frac{CA_v}{2W_o} + 1\right]^4 + \ldots \qquad (17)$$

For the binomial expansion approach described above, the procedure for determining the time interval DC is as follows:

(1) Measure intervals A, B and C.

(2) Determine $(A_v/W_o)$ as a function of A, B and C using an expression which is reciprocal of expression (13).

(3) Determine the value of the term x, where $$x = \left[\frac{C}{2} \frac{A_v}{W_o}\right] + 1 \qquad (18)$$

(4) Determine the interval DC as as function of C, $A_v/W_o$ and x using the expression:

$$DC = \frac{C}{2} x - \frac{C^2}{8} \frac{A_v}{W_o} x^2 + \frac{C^3}{16}\left[\frac{A_v}{W_o}\right]^2 x^3 - \frac{5C^4}{128}\left[\frac{A_v}{W_o}\right]^3 x^4 \qquad (17)$$

Although expression (19) gives the time interval DC as an infinite series, it has been determined that the solution of only four terms (as shown above) provides acceptable accuracy in the dead center determination. Specifically, the timing error under maximum expected engine acceleration, using only four terms of expression (17) is 0.16 piston cycle degrees. Of course, more terms of expression (17) may be solved to increase the accuracy of the timing determination if desired.

Thus, expressions (6) and (13), or expressions derived therefrom, may be used to determine the time interval DC in terms of just A, B and C. Since the dimensions $\phi_s$, $\phi_{dc}$ and $\phi_t$ are not required in the determination of time $T_{dc}$, error due to sensor tolerance and assembly variations is substantially eliminated. As indicated above, the approximate terms in expression (13) stem primarily from expressions (7) and (8) and the error due to such approximation is minimized if $\phi_s$ is small compared to $\phi_t$.

If desired, timing of the control event relative to the dead center may be determined according to the expression:

$$TIMING = DC - E \qquad (20)$$

In addition, the value of time $T_{dc}$ may be determined according to the expression:

$$T_{dc} = T_1 + DC \qquad (21)$$

Figure 5:
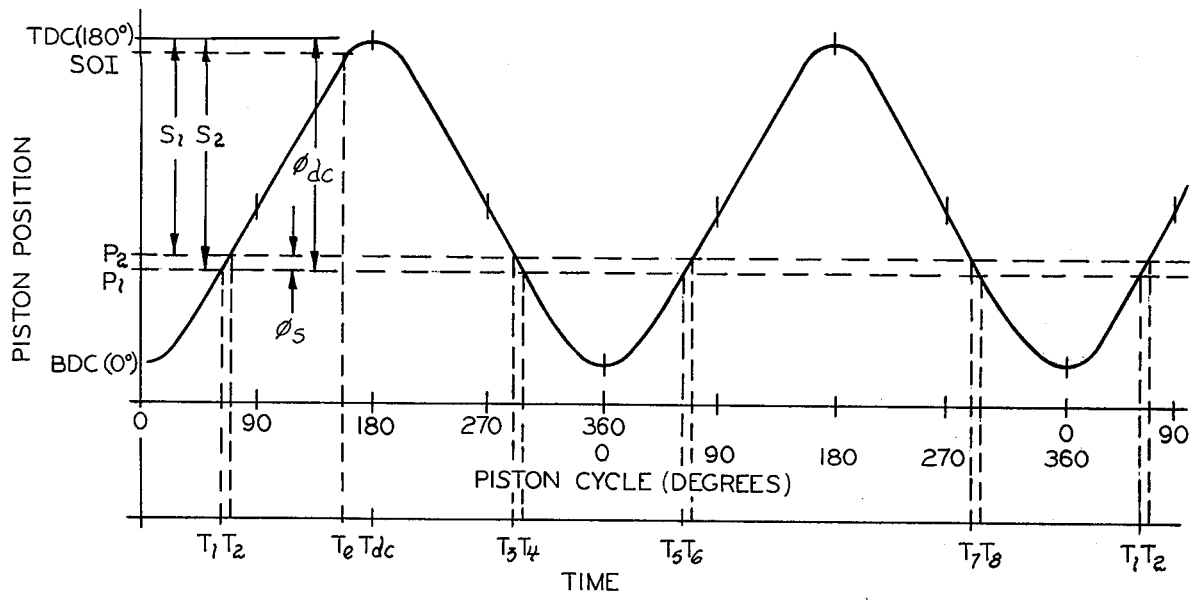
FIG. 5 is an idealized graph of piston position vs. time for engine operation at constant average speed.

FIG. 5 depicts the position of piston 10 as a function of time during engine operation at constant average speed. Additionally, the angular displacement of piston 10 in piston cycle degrees is shown on a horizontal axis. It will, of course, be recognized that the depicted piston position waveform has been idealized as a pure sine wave, and that the actual waveform contains a substantial amount of harmonic distortion. However, such distortion is symmetrical about top dead center. Hence, the width of the sensor pulses 72 and 73 are equally affected by the positional distortion and the timing value determined according to the teachings of this invention is insensitive thereto. The points of interest on the piston position scale are top dead center (TDC), bottom dead center (BDC), start of fuel injection (SOI), and reference piston positions ($P_1$ and $P_2$) defined by the passage of piston vane 14 through sensor arms 30 and 32. On the time scale, the time designations $T_1$-$T_8$ correspond to the occurrences of the reference piston positions $P_1$ and $P_2$ for two complete piston cycles. Time $T_c$ corresponds to the start of injection (SOI), and time $T_{dc}$ corresponds to top dead center.

The exact relation of the pulses 72 and 73 with respect to piston movement will now be described with reference to FIGS. 4 and 5. As piston 10 approaches top dead center position (TDC) from its bottom dead center position (BDC), output line 82 of Schmitt trigger 70 is at a logic 1 voltage level corresponding to unaltered magnetic coupling, designated by reference numeral 60 in graph A of FIG. 4. At time $T_1$ piston 10 reaches position $P_1$ at which time the leading edge of vane 14 enters sensor air gap 34. At this point, a period of altered magnetic coupling 62 is commenced and the voltage potential on line 82 falls to a logic zero level as indicated in graph C of FIG. 4 by reference numeral 74. At time $T_2$ piston 10 reaches position $P_2$ at which time the trailing edge of vane 14 leaves the air gap 34. At this point a period 60 of unaltered magnetic coupling is restored and the voltage on line 82 returns to a logic 1 level as designated by reference numeral 76. At time $T_e$, the engine operation related event (SOI) occurs. For the example depicted in FIG. 5, SOI occurs about six degrees before TDC. At time $T_{dc}$, piston 10 reaches the top dead center position and reverses its direction of travel. At time $T_3$, piston 10 reaches position $P_2$ at which time the leading edge of vane 14 enters air gap 34. At this point, a period of altered magnetic coupling 62 is resumed and the voltage on line 82 falls to a logic zero voltage level as indicated in graph C of FIG. 4 by reference numeral 78. At time $T_4$, piston 10 reaches position $P_1$ at which time the trailing edge of vane 14 leaves air gap 34. At this point, a period of unaltered magnetic coupling is restored and the voltage on line 82 rises to a logic 1 voltage level as designated by reference numeral 80.

In view of the above, it will be seen that falling edge 74 of pulse 72 and rising edge 80 of pulse 73 correspond to a single piston position $P_1$. Similarly, rising edge 76 of pulse 72 and falling edge 78 of pulse 73 correspond to a single piston position $P_2$. Thus, sensor pulse 72 is defined by times $T_1$ and $T_2$, and sensor pulse 73 is defined by times $T_3$ and $T_4$. Times $t_5-T_8$, define a second pair of sensor pulses 72 and 73 but such pulses occur in an exhaust/intake cycle, and there is no fuel injection or combustion.

Figure 6:
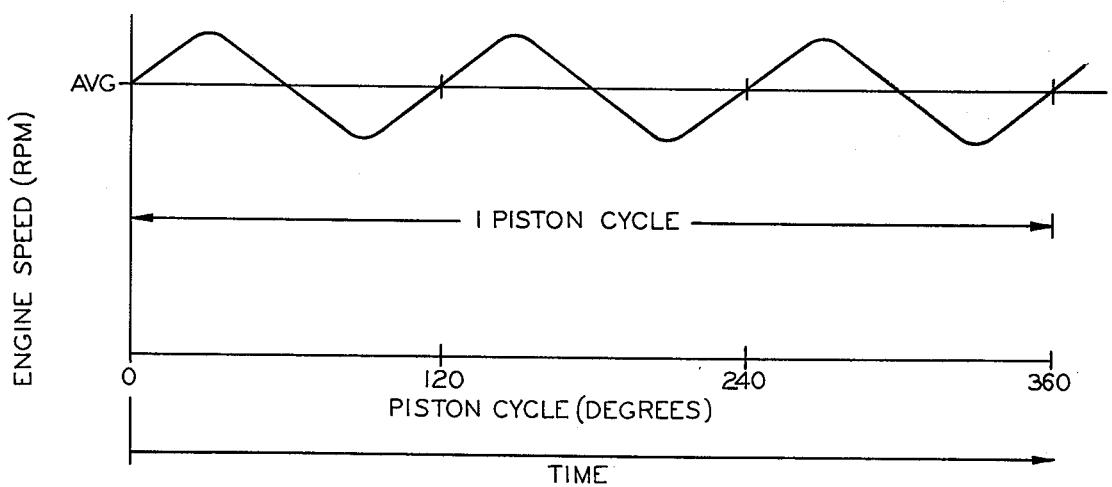
FIG. 6 is an idealized graph of engine speed vs. time illustrating speed variations due to isolated engine combustion events.

FIG. 6 depicts engine speed as a function of time for a six-cylinder internal combustion engine. As noted in reference to FIG. 5, the combustion events in four-stroke internal combustion engines occur in alternate piston cycles. Accordingly, there are three combustion events and therefore three cyclic engine speed variations per piston cycle in a six-cylinder, four-stroke engine. The speed variations occur in sequence and are depicted in FIG. 5 as an oscillatory speed component superimposed on the average engine speed (AVG). It will be recognized that such speed variations may induce some error in the timing determination. In this regard, the greatest such error would occur if the placement of sensor 22 and vane 14 were such that the distance between pulses 72 and 73 were 60 piston cycle degrees. In such case, the pulse 72 might occur in a speed oscillation valley while pulse 73 occurs in a speed oscillation peak, or vice versa.

This invention overcomes the above problem by recognizing that if sensor 22 and vane 14 are located so that the distance between pulses 72 and 73 is an integral multiple of 360/N piston cycle degrees—where N is the number of combustion events per piston cycle—the pulses 72 and 73 will occur in phase with the speed variations, and will therefore be equally affected thereby. As a result, the timing determination will be substantially insensitive to the speed variations. For a six-cylinder, four-stroke engine such as the one referred to in FIG. 6, the distance between sensor pulses 72 and 73 should thus be an integral multiple of 120 piston cycle degrees. Put somewhat differently, the distance $S_1$ or $S_2$ between top dead center and the reference piston positions $P_2$ or $P_1$ should be an integral multiple of 180/N piston cycle degrees. So long as $(S_2-S_1)$ is small compared to $S_1$ or $S_2$, it is sufficient that either $P_1$ or $P_2$ be positioned an integral multiple of 180/N piston cycle degrees from top dead center.

For the purpose of discussion, it will hereinafter be assumed that the engine referred to is a six-cylinder, four-stroke internal combustion engine and that sensor 22 and vane 14 are positioned so that the distance $S_2$ corresponds to 120 piston cycle degrees.

It will be recognized that the timing determination may thus be used in conjunction with a full-time or part-time closed loop control system for controlling the timing of the control event. As previously noted, the event is typically the start of fuel injection for a diesel engine and spark for a gasoline engine. For convenience, however, this invention will be described primarily in the context of a diesel engine fuel injection system.

Figure 7:
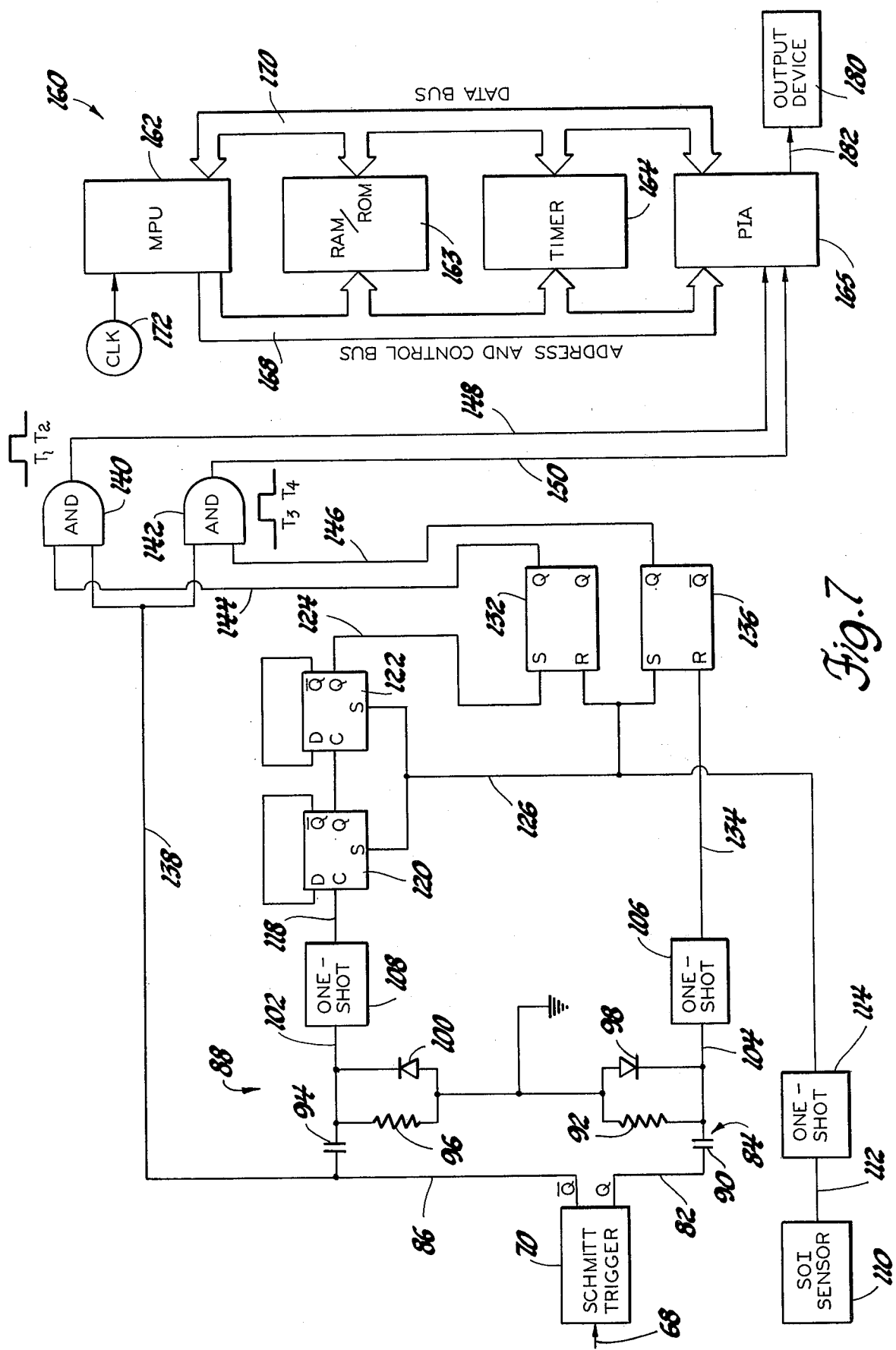
FIG. 7 illustrates circuitry for implementing the timing system of this invention.
Figure 10:
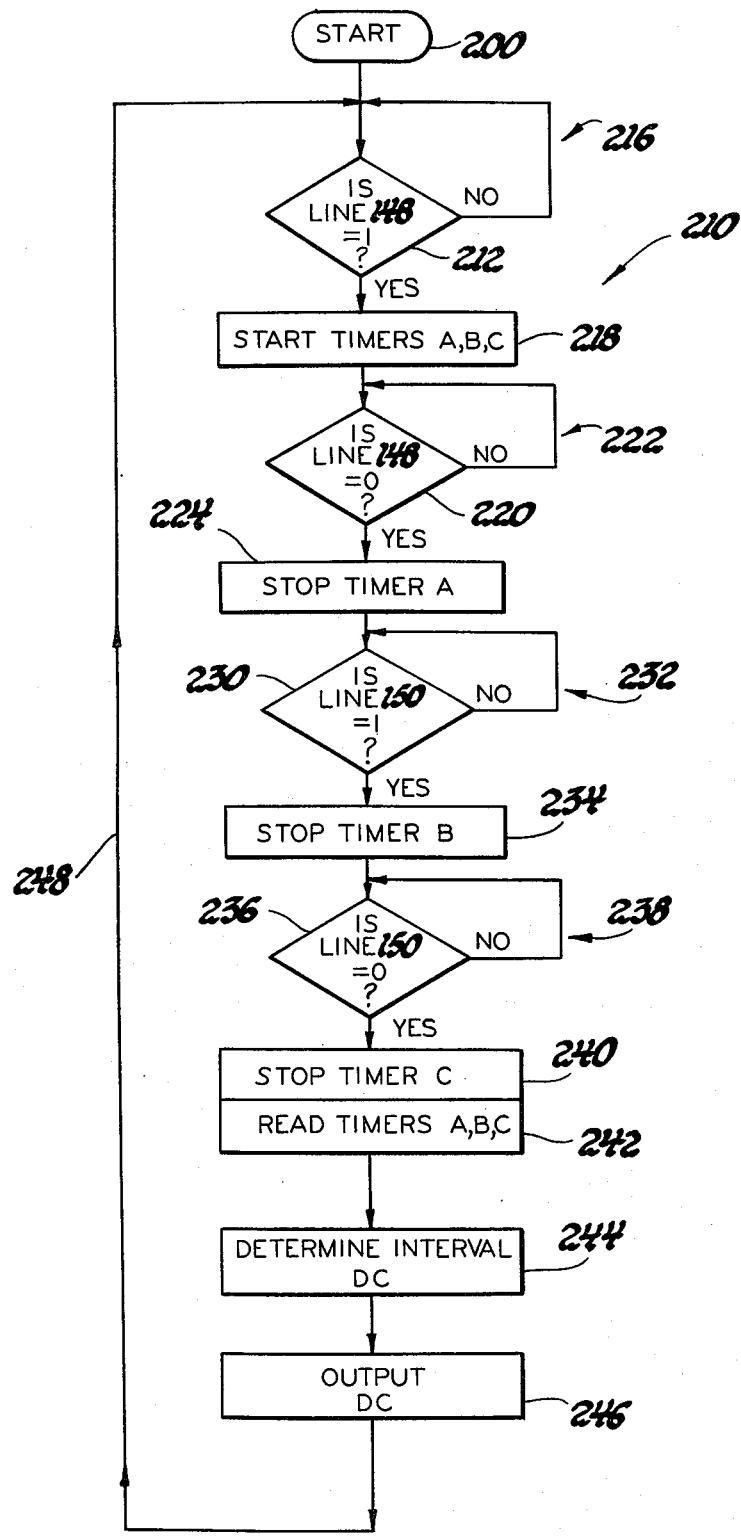
FIGS. 10-12 are flow diagrams for the circuit shown in FIG. 7 for implementing this invention.
Figure 11:
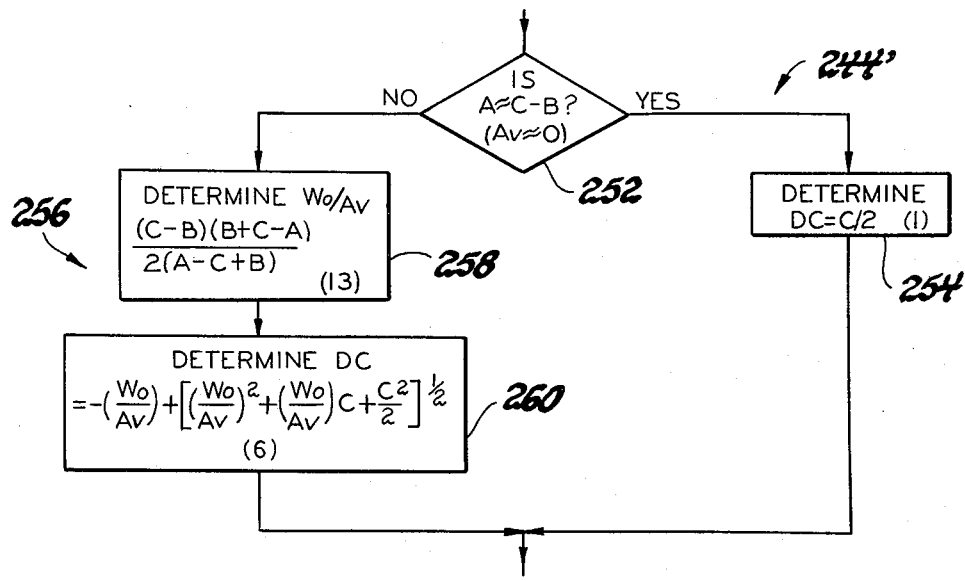
Figure 12:
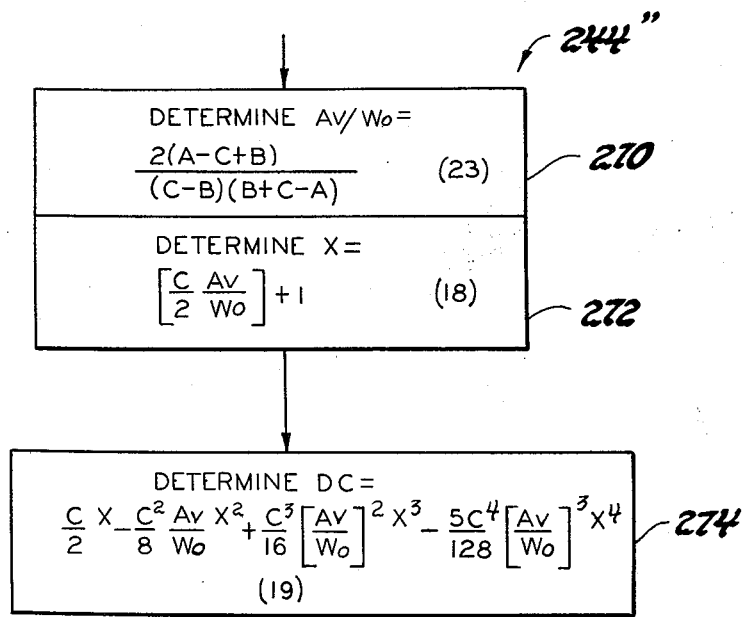

FIG. 7 depicts circuitry for implementing this invention with a programmed microprocessor. A microprocessor flow diagram is depicted in FIGS. 10–12.

Referring now to FIG. 7, Schmitt trigger 70, which was described above in reference to FIG. 3, receives filtered sensor pulses via line 68. Although not indicated in FIG. 3, Schmitt trigger 70 has both a normal or uninverted output Q which is depicted in graph C of FIG. 4 and in FIG. 9, and an inverted output $\bar{Q}$. The Q output is connected via line 82 to an RC differentiator designated generally by reference numeral 84, and the $\bar{Q}$ output is connected via line 86 to an identical RC differentiator, designated generally by reference numeral 88. Specifically, differentiator 84 comprises capacitor 90 and resistor 92, and differentiator 88 comprises capacitor 94 and resistor 96. Differentiators 84 and 88 are conventional RC circuits which function to produce sharp positive or negative voltage pulses in response to rising or falling voltage transitions in an input signal. Diodes 98 and 100 cooperate with differentiators 84 and 88 respectively in a manner to suppress negative voltage pulses.

In view of the foregoing, it will be understood that the voltage pulses on line 104 correspond to the trailing edges 76 and 80 of sensor pulses 72 and 73 while the voltage pulses on line 102 correspond to the leading edges 74 and 78 of sensor pulses 72 and 73. Lines 104 and 102 are connected as inputs to one-shots 106 and 108 respectively. One-shots 106 and 108 are conventional multivibrator devices and serve to produce clean, short duration pulses in response to trigger pulses such as the pulses appearing on lines 104 and 102.

Reference numeral 110 generally designates a sensor for detecting the initiation of an engine control event such as the start of fuel injection (SOI) in a diesel engine. Sensor 110 may be any of a number of suitable devices such as a pressure or Piezoelectric transducer placed in communication with the fuel injection line or fuel injection for cylinder 12. The output of sensor 110 is applied as an input via line 112 to one-shot 114 for producing sharp, short duration pulses corresponding to the start of injection SOI.

Figure 8:
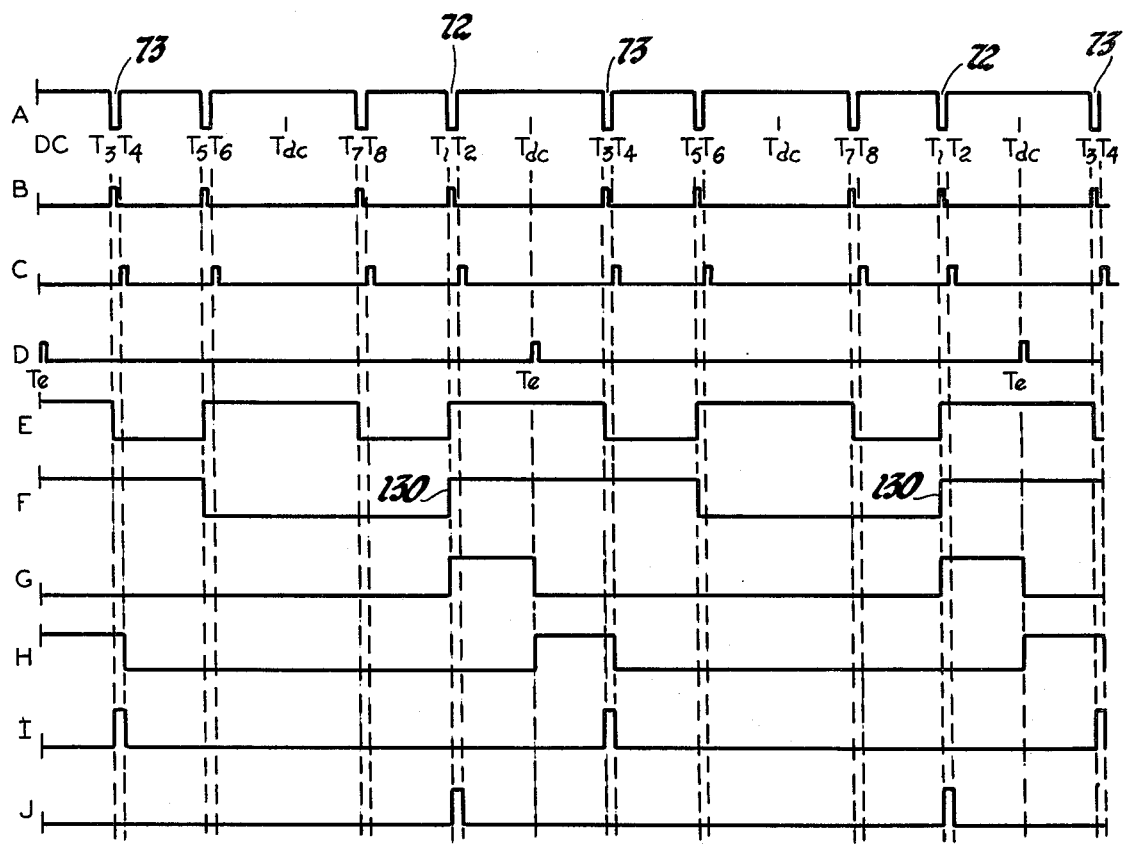
FIG. 8 is a graph depicting various idealized waveforms as a function of time for the circuit shown in FIG. 7.

The above-described waveforms are depicted in FIG. 8, graphs A-D, as a function of time. Graph A depicts the sensor pulses 72 and 73 as they appear at the Q output of Schmitt trigger 70; graph B depicts the leading edge pulses at the output of one-shot 108; graph C depicts the trailing edge pulses at the output of one-shot 106; and graph D depicts the SOI pulses at the output of one-shot 114. As in FIG. 5, time designations $T_1-T_8$ correspond to the time occurrences of the various pulses and pulse edges in graphs A and D to more clearly illustrate the time relationships among the depicted waveforms. Since the engine is of the four-stroke type, the SOI pulses occur in alternate piston cycles, and for the operating conditions depicted in FIG. 8, it will be seen that SOI occurs at time $T_{dc}$.

Referring now again to FIG. 7, the output of one-shot 108 is connected via line 118 to the clock input (C) of D-type flip-flop 120, the Q output of which is connected to the clock input (C) of D-type flip-flop 122. The $\bar{Q}$ outputs of flip-flops 120 and 122 are fed back to their data (D) inputs so that the flip-flops 120 and 122 form a Divide-By-Four logic circuit, the output of which appears on the Q output of flip-flop 122. The output of one-shot 114 is applied via line 126 to the set (S) inputs of flip-flops 120 and 122 so that the Divide-By-Four function is synchronized with the SOI pulses. Such synchronization is necessary as a practical matter because the output states of flip-flops 120 and 122 are not determinable when power is initially applied to the circuit.

Referring again to FIG. 8, graphs E and F depict the Q outputs of flip-flops 120 and 122, respectively. When the first SOI pulse is received, both flip-flops 120 and 122 are set, and thereafter, the outputs change states according to the leading edge pulses depicted in graph B and appearing at the output of one-shot 108. It will thus be seen that a logic zero-to-logic one voltage transition at the Q output of flip-flop 122 (depicted in graph F of FIG. 8 by reference numeral 130) corresponds in time to the leading edge 74 of a pulse 72 preceding the top dead center position of piston 10.

The Q output of flip-flop 122 is applied via line 124 to the set (S) input of RS flip-flop 132 and the output of one-shot 106 is applied via line 134 to the reset (R) input of RS flip-flop 136. The SOI pulses on line 126 are applied to the reset input (R) of flip-flop 132 and to the set input (S) of flip-flop 136. Graphs G and H of FIG. 8 depict the Q outputs of flip-flops 132 and 136, respectively. As may be seen in graph G, the Q output of flip-flop 132 is set on the leading edge 74 of a sensor pulse 72 and is reset by an SOI pulse. As may be seen in graph H, the Q output of flip-flop 136 is set by an SOI pulse and is reset by the trailing edge 80 of sensor pulse 73.

The $\bar{Q}$ output of Schmitt trigger 70 is connected via lines 86 and 138 as an input to both AND gates 140 and 142. The Q output of flip-flop 132 is connected via line 144 as an input to AND gate 140 and the Q output of flip-flop 136 is connected via line 146 as an input to AND gate 142. The outputs of AND gates 142 and 140 are depicted in graphs I and J of FIG. 9 as a function of time. As may be seen in graph J, the output of AND gate 140 assumes a logic 1 voltage level only during a sensor pulse 72; and as may be seen in graph I, the output of AND gate 142 assumes a logic one voltage level only during a sensor pulse 73.

Reference numeral 160 generally designates a microprocessor-based controller comprising MPU 162, memory device (RAM/ROM) 163, Timer 164 and PIA 165. The basic operation of elements 162–165, is well-known to those skilled in the art and it will be appreciated that such elements may be any of a number of known commercially available devices, such as those manufactured by Motorola Semiconductor Components, Inc. Thus, MPU 162 may be the MC6802, Timer 164 may be the MC6840, and PIA 165 may be the MC6821. MPU 162 communicates with elements 163–165 via an Address and Control Bus 168 and a bidirectional Data Bus 170. As indicated by the designation RAM/ROM, memory element 163 includes both Random-Access-Memory (RAM) and Read-Only-Memory (ROM). The Read-Only-Memory is used for permanent retention of data and the program to be executed by MPU 162, while Random-Access-Memory is used for temporary retention of data obtained during the execution of the program. Peripheral Interface Adapter (PIA) 165 interfaces the other system elements with input and output devices, and clock 172 provides MPU 162 with a high frequency pulse train for controlling the timing of the program execution.

Timer 164 comprises three separate timers, designated hereinafter as Timer A, Timer B and Timer C, each of which is adapted to receive and count clock pulses from a pulse source, such as clock 172. As will become apparent in reference to the description of FIG. 10, Timer A is used to measure the duration of interval A, Timer B is used to measure the duration of interval B and Timer C is used to measure the duration of interval C. The operation of the timers is controlled by MPU 162 via Address and Control Bus 168, and MPU 162 may read or modify the count in any timer via Data Bus 170.

The outputs of AND gates 140 and 142 are applied as inputs to PIA 165 via lines 148 and 150, respectively, and controller 160 operates on the inputs as will be described in reference to FIGS. 10–12 in a manner to determine time intervals A, B and C, and to determine therefrom the duration of time interval DC. A digital representation of such interval is applied through PIA 165 to an output device 180 via line 182.

The timing system of this invention as illustrated herein thus provides an indication of the timing of time $T_{dc}$ relative to time $T_1$. As noted above, such indication may be used in conjunction with other suitable elements for diagnostic or control purposes. Accordingly, output device 180 does not form a part of this invention and a detailed description of it will not be given. By way of example and without any limitation, such other elements may include circuit means for measuring the duration of interval E, and for differencing intervals E and DC as in expression (20) to provide an indication of the timing of the engine control event relative to the dead center position.

FIGS. 10–12 depict a flow diagram for the computer program stored in memory device 163. Referring now particularly to FIG. 10, reference numeral 200 designates a series of start instructions for initializing the various registers in memory device 163 and timer 164. As will become apparent, the program instructions designated by reference numeral 210 serve to decode the information provided on lines 148 and 150 in order to determine the duration of intervals A, B and C.

Block 212 designates program instructions for determining if line 148 is at a logic 1 voltage potential. If not, instruction block 212 is re-executed and MPU 162 is stuck in the loop designated by reference numeral 216. When line 148 rises to a logic 1 voltage potential, MPU 162 leaves loop 216 and starts the counting of timers A, B and C as designated by instruction block 218. MPU 162 then determines whether line 148 is at a logic zero potential, as indicated at instruction block 220. If not, instruction block 220 is re-executed and MPU 162 is stuck in the loop designated by reference numeral 222. When line 148 falls to a logic zero voltage potential, MPU 162 stops Timer A as designated by instruction block 224. The count in Timer A thus corresponds to the duration of interval A as defined in FIG. 9.

MPU 162 then determines if line 150 is at a logic 1 voltage potential as designated by instruction block 230. If not, instruction block 230 is re-executed and MPU 162 is stuck in the loop designated by reference numeral 232. When line 150 rises to a logic 1 voltage potential, MPU 162 stops Timer B as designated by instruction block 234. The count stored in Timer B thus represents the duration of interval B as defined in FIG. 9.

MPU 162 then determines if line 150 is at a logic zero voltage potential as designated by instruction block 236. If not, instruction block 236 is re-executed and MPU 162 is stuck in the loop designated by reference numeral 238. When line 150 falls to a logic zero voltage potential, MPU 162 stops Timer C as indicated at instruction block 240. The count in Timer C thus represents the duration of interval C as defined in FIG. 9.

MPU 162 then reads the contents of Timers A, B and C and stores them in memory 163 as indicated at instruction block 242. As indicated at instruction block 244, MPU 162 then determines the duration of time interval DC. The flow diagrams 244' and 244" depicted in FIGS. 11 and 12, respectively, illustrate alternate procedures for determining time interval DC as described above.

After interval DC is determined, MPU 162 outputs the timing indication on line 182 as indicated at instruction block 246. At this point, MPU 162 returns to instruction block 212 and re-executes the above-described instructions as indicated by flow line 248.

FIG. 11 depicts a flow diagram 244' for instruction block 244 (DETERMINE INTERVAL DC) of FIG. 10 according to a first embodiment wherein the interval DC is determined using expressions (1), (6) and (13). As indicated at instruction block 252, it is first determined, by comparing intervals A and (C–B), whether there is significant engine acceleration between times $T_1$ and $T_4$. If the engine is running at constant velocity, interval A is equal to interval (C–B), while under engine acceleration the intervals are unequal. If interval A is substantially equal to the interval (C–B), MPU 162 determines the interval DC according to expression (1) as designated at instruction block 254. If interval A is not substantially equal to interval (C–B), MPU 162 determines the interval DC according to expressions (6) and (13) as generally designated by reference numeral 256. In such case, the expression ($W_o/A_v$) is determined according to expression (13) as indicated by instruction block 258 and the interval DC is determined according to expression (6) as indicated at instruction block 260.

FIG. 12 depicts a flow diagram 244" for instruction block 244 of FIG. 10 according to a second embodiment wherein the interval DC is determined using expressions (13), (18) and (19). As indicated at instruction block 270, the term ($A_v/W_o$) is determined using the reciprocal of expression (13):

$$\frac{A_v}{W_o} = \frac{2(A - C + B)}{(C - B)(B + C - A)} \quad (23)$$

Then, as in expression (18), the value of the term x is determined as a function of C and ($A_v/W_o$) as indicated at instruction block 272. Then, as indicated at instruction block 274, the interval DC is determined as a function of C, x and ($A_v/W_o$) in accordance with expression (19).

As indicated earlier, the interval DC is preferably determined according to the procedure represented by flow diagrams 244" since the acceleration term $A_v$ does not appear in the denominator of expressions (18) or (19). Thus, such expressions may be conveniently used to determine interval DC, even when the engine acceleration $A_v$ approaches zero.

It will be understood by those skilled in the art of engine design that wrist pin 13 may be slightly offset from the centerline of the cylinder 12 in order to prevent a condition known as piston slap, wherein the piston abruptly moves from one cylinder sidewall to the other at or near the top of its stroke. In such case, the top dead center position is not the midpoint of the sensor pulses but is slightly offset to one side. Since the timing indication disclosed herein is based on the assumption that the sensor pulses 72 and 73 are symmetrically spaced about the dead center position ($\phi_t = 2\phi_{dc}$), there will be a slight error or offset in the timing indication when the method of this invention is applied to engines having the wrist pin offset. However, such offset or error is determinable as a function of the connecting rod length, the wrist pin offset distance, and the piston stroke. Since the error is constant for a particular engine design, it may be accounted for by MPU 162 or by output device 180.

Although this invention has been described in reference to specific embodiments, it will be recognized that various modifications may occur to those skilled in the art. For example, the sensor for producing pulses 72 and 73 may be modified to include different sensing elements or the location of the sensor may be modified so that the pulses are produced in response to the movement of a piston-related member, such as a connecting rod or valve rocker arm. In this regard, it will be understood that such modifications may be within the scope of this invention which is limited only by the appended claims.

The embodiments of the invention in which an exclusive property or privilege is claimed are defined as follows:

1. In an internal combustion engine including a piston which cyclically reciprocates between top and bottom dead center positions in synchronism with the speed of the engine, apparatus comprising:

means for sensing passage of the piston through a reference position at time $T_1$ as the piston moves toward one of the dead center positions and at time $T_4$ as the piston moves away from the dead center position thereby defining a time interval C between times $T_1$ and $T_4$, means for sensing the engine velocity $W_o$ substantially at time $T_1$ and $W_f$ substantially at time $T_4$; and means for determining the duration of an interval DC between time $T_1$ and the time $T_{dc}$ at which the piston passes through the dead center position by simultaneously solving the motion expressions:

$$\phi_{dc} = (\tfrac{1}{2})A_v(DC)^2 + W_o(DC)$$

and $$2\phi_{dc} = (\tfrac{1}{2})A_v(C)^2 + W_o(C)$$

where $A_v$ is the average engine acceleration between times $T_1$ and $T_4$ and $\phi_{dc}$ is the distance between the dead center position and the reference piston position, thereby yielding $$DC = -\frac{W_o}{A_v} + \left[\left(\frac{W_o}{A_v}\right)^2 + \left(\frac{W_o}{A_v}\right)(C) + \frac{(C)^2}{2}\right]^{\frac{1}{2}}$$

where the quantity $$\left(\frac{W_o}{A_v}\right)$$

is determinable solely as a function of times $T_1$ and $T_4$, and engine velocities $W_o$ and $W_f$, substantially according to the expression:

$$\frac{W_o}{A_v} = \frac{W_o(C)}{(W_f - W_o)}$$

whereby the distance $\phi_{dc}$ may be unknown, and the determination of time interval DC is substantially insensitive to variations in the distance $\phi_{dc}$ due to part tolerances during engine assembly or during subsequent engine operation.

2. In an internal combustion engine including a piston which cyclically reciprocates between top and bottom dead center positions in synchronism with the speed of the engine, apparatus comprising:

means for sensing successive passage of the piston through first and second reference positions $P_1$ and $P_2$ at times $T_1$ and $T_2$, respectively, as the piston moves toward one of the dead center positions defining a time interval A between times $T_1$ and $T_2$, and for the sensing successive passage of the piston through the second and first reference positions $P_2$ and $P_1$ at times $T_3$ and $T_4$, respectively, as the piston moves away from the dead center position defining a time interval B between times $T_1$ and $T_3$, and a time interval C between times $T_1$ and $T_4$; and means for determining the duration of a time interval DC between time $T_1$ and time $T_{dc}$ at which the piston passes through the dead center position by simultaneously solving the motion expressions:

$$\phi_{dc} = \tfrac{1}{2}A_v(DC)^2 + W_o(DC)$$

and $$2\phi_{dc} = \tfrac{1}{2}A_v(C)^2 + W_o(C)$$

where $W_o$ is an initial engine velocity, $A_v$ is the average engine acceleration, and $\phi_{dc}$ is the distance between the dead center position and reference piston position $P_1$, thereby yielding $$DC = -\frac{W_o}{A_v} + \left[\left(\frac{W_o}{A_v}\right)^2 + \left(\frac{W_o}{A_v}\right)(C) + \frac{(C)^2}{2}\right]^{\frac{1}{2}}$$

where the quantity $$\left(\frac{W_o}{A_v}\right)$$

is determinable solely as a function of intervals A, B and C, substantially according to the expression:

$$\frac{W_o}{A_v} = \frac{(C - B)(B + C - A)}{2(A - C + B)}$$

whereby the determination of the duration of interval DC is substantially insensitive to variations in the precise location of the dead center position with respect to the reference piston positions as a result of parts tolerances during engine assembly or as a result of parts wear during subsequent engine operation.

3. In an internal combustion engine including a piston which cyclically reciprocates between top and bottom dead center positions in synchronism with the speed of the engine, the method comprising:

sensing successive passage of the piston through first and second reference positions $P_2$ and $P_1$ at times $T_1$ and $T_2$, respectively, as the piston moves toward one of the dead center positions and for sensing successive passage of the piston through the second and first reference positions $P_1$ and $P_2$ at times $T_3$ and $T_4$, respectively, as the piston moves away from the dead center position, the positions $P_1$ and $P_2$ being spaced relatively close to each other and at a relatively long distance $\phi_{dc}$ from the dead center position;

determining the durations of an interval A defined by times $T_1$ and $T_2$, an interval B defined by times $T_1$ and $T_3$ and an interval C defined by times $T_1$ and $T_4$; and determining the duration of an interval DC between time $T_1$ and the dead center position (1) according to the expression:

$$DC = C/2$$

if interval A is substantially equal to the difference of intervals B and C, or (2) according to the expression:

$$DC = -\frac{W_o}{A_v} + \left[\left(\frac{W_o}{A_v}\right)^2 + \left(\frac{W_o}{A_v}\right)(C) + \frac{C^2}{2}\right]^{\frac{1}{2}}$$

if interval A is not substantially equal to the difference of intervals B and C, where the term $(W_o/A_v)$ is given by the expression:

$$\frac{W_o}{A_v} = \frac{(C - B)(B + C - A)}{2(A - C + B)}$$

whereby the determination of interval DC is substantially insensitive to variations in the distance $\phi_{dc}$ as a result of part tolerances during engine assembly or as a result of part wear during subsequent engine operation.

* * * * *